(12) United States Patent
Shoji

(10) Patent No.: US 10,219,432 B2
(45) Date of Patent: Mar. 5, 2019

(54) GRASS CUTTER

(71) Applicant: KUBOTA CORPORATION, Osaka (JP)

(72) Inventor: Yusuke Shoji, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 98 days.

(21) Appl. No.: 14/691,943

(22) Filed: Apr. 21, 2015

(65) Prior Publication Data

US 2016/0309649 A1 Oct. 27, 2016

(51) Int. Cl.
*A01D 67/00* (2006.01)
*A01D 34/71* (2006.01)
*A01D 43/063* (2006.01)

(52) U.S. Cl.
CPC ........... *A01D 34/71* (2013.01); *A01D 43/063* (2013.01)

(58) Field of Classification Search
CPC ..... A01D 2101/00; A01D 34/71; A01D 34/63
USPC ....................................... 56/320.2
See application file for complete search history.

(56) References Cited

U.S. PATENT DOCUMENTS

| | | | | |
|---|---|---|---|---|
| 3,514,931 A | * | 6/1970 | Solheim | A01D 43/0631 56/255 |
| 3,872,656 A | * | 3/1975 | Dahl | A01D 43/0631 56/202 |
| 3,925,972 A | * | 12/1975 | Andersson | A01D 34/71 56/202 |
| 4,617,786 A | * | 10/1986 | Fell | A01F 29/09 241/101.77 |
| 5,033,260 A | * | 7/1991 | Jerry | A01D 43/0631 56/202 |
| 5,107,566 A | * | 4/1992 | Schmid | A47L 7/04 15/328 |
| 6,862,875 B2 | * | 3/2005 | Iida | A01D 34/71 56/320.2 |
| 7,624,562 B2 | * | 12/2009 | Kallevig | A01D 34/71 56/320.2 |
| 8,234,849 B2 | * | 8/2012 | Shimozono | A01D 42/005 56/320.1 |
| 2002/0083694 A1 | * | 7/2002 | Nagai | A01D 43/0635 56/16.8 |
| 2008/0134654 A1 | * | 6/2008 | Kohler | A01D 34/82 56/320.2 |
| 2013/0097987 A1 | * | 4/2013 | Kaskawitz | A01D 34/005 56/320.2 |
| 2014/0075901 A1 | * | 3/2014 | Kimura | A01D 43/063 56/2 |

FOREIGN PATENT DOCUMENTS

JP    4005611    8/2007

* cited by examiner

*Primary Examiner* — Thomas B Will
*Assistant Examiner* — Mai T Nguyen
(74) *Attorney, Agent, or Firm* — Greenblum & Bernstein, P.L.C.

(57) ABSTRACT

A grass cutter is provided with a duct which extends in a conveyance direction of grass clippings and has a conveyance path for the grass clippings formed inside of the duct; and a duct opening/closing lid provided with a turning shaft which is disposed on the outer side of the duct, and a closing plate which is turnable around the axis of the turning shaft and opens and closes the conveyance path by turning.

28 Claims, 11 Drawing Sheets

GRASS CUTTER

TECHNICAL FIELD

The disclosure relates to a grass cutter provided with a duct and a duct opening/closing lid.

BACKGROUND ART

JP 4005611 B1 discloses a grass cutter (lawn cutter) capable of switching between a grass collecting mode (bagging mode) for collecting grass clippings cut by rotary blades (cutting blades) housed in a mower deck into a grass collector through a duct and a mulching mode for discharging grass clippings cut by the rotary blades to the lower side of the mower deck. In the grass cutter, a duct opening/closing lid (shutter) is disposed on a conveyance path formed inside the duct (a passage opening between the mower deck and the duct). The duct opening/closing lid is provided with a turning shaft which extends in the up-down direction in adjacent to the inner face of a side wall of the duct and a closing plate (shutter member) which has a swing base end attached to the turning shaft and opens and closes the conveyance path by swing operation. The opening degree of the conveyance path is adjusted by the duct opening/closing lid having such a configuration.

However, since a turning shaft is disposed inside a duct (on a conveyance path for grass clippings) in a conventional grass cutter, the turning shaft obstructs the conveyance of grass clippings, which disadvantageously causes grass clogging.

SUMMARY OF INVENTION

The object of the disclosure is to provide a grass cutter capable of preventing the occurrence of grass clogging and also capable of opening and closing a conveyance path formed inside a duct.

One aspect of the disclosure provides a grass cutter comprising: a duct extending in a conveyance direction of grass clippings and having a conveyance path for the grass clippings formed inside the duct; and a duct opening/closing lid provided with a turning shaft disposed on an outer side of the duct and a closing plate turnable around an axis of the turning shaft, the closing plate opening and closing the conveyance path by turning.

This configuration makes it possible to prevent the occurrence of grass clogging and also open and close the conveyance path formed inside the duct.

According to a preferred embodiment of the grass cutter, the turning shaft is disposed substantially perpendicular to the conveyance direction for grass clippings.

This configuration makes it possible to easily allow the closing plate to be substantially perpendicular to the conveyance direction of grass clippings. Accordingly, it is possible to easily block grass clippings conveyed rearward.

According to a preferred embodiment of the grass cutter, the duct includes a side wall covering the conveyance path from a lateral side, and the turning shaft is disposed along an outer face of the side wall.

This configuration makes it possible to prevent the occurrence of grass clogging.

According to a preferred embodiment of the grass cutter, the duct includes a bottom wall covering the conveyance path from a lower side, and the closing plate is disposed in such a manner that a lower end of the closing plate is separated from an inner face of the bottom wall when the conveyance path is closed by the closing plate.

This configuration makes it possible to return grass clippings that have been conveyed to the rear side (conveyance direction side) of the closing plate and remained on the rear side to the front side (opposite side of the conveyance direction) through a gap between the lower end of the closing plate and the inner face of the bottom wall. Accordingly, it is possible to prevent the occurrence of grass clogging and also allow the closing plate to smoothly turn.

According to a preferred embodiment of the grass cutter, an upper end of the closing plate is bent in a direction opposite to the conveyance direction of the grass clippings when the conveyance path is closed by the closing plate.

This configuration makes it possible to actively guide grass clippings in a direction opposite to the conveyance direction when the conveyance path is closed by the closing plate.

According to a preferred embodiment of the grass cutter, the crass cutter is further provided with a link mechanism turning the closing plate.

This configuration makes it possible to open and close the conveyance path by the closing plate by turning the closing plate by the link mechanism.

According to a preferred embodiment of the grass cutter, the turning shaft is turnable around the axis of the turning shaft, the closing plate is coupled to the turning shaft so as to turn in conjunction with turn of the turning shaft, and the link mechanism is coupled to the turning shaft.

This configuration makes it possible to turn the closing plate by turning the turning shaft by the link mechanism. Further, since the link mechanism is coupled to the turning shaft disposed on the outer side of the duct, it is possible to easily dispose the link mechanism.

According to a preferred embodiment of the grass cutter, the duct includes a bottom wall inclined with respect to a horizontal direction, and the turning shaft is disposed substantially perpendicular to the bottom wall.

This configuration makes it possible to prevent grass clippings from being accumulated on the bottom wall of the duct to cause grass clogging. Further, it is possible to prevent the closing plate from being caught in grass clippings accumulated on the bottom wall to obstruct smooth turn of the closing plate.

According to a preferred embodiment of the grass cutter, the link mechanism is coupled to a lower end of the turning shaft.

This configuration makes it possible to easily dispose the link mechanism.

According to a preferred embodiment of the grass cutter, the link mechanism includes a coupling member fixed to the turning shaft, and an operation unit coupled to the coupling member, the operation unit moving to allow the coupling member to turn around the axis of the turning shaft.

This configuration makes it possible to turn the closing plate to open and close the conveyance path by moving the operation unit.

According to a preferred embodiment of the grass cutter, the operation unit reciprocates in a right-left direction.

This configuration makes it possible to turn the closing plate to open and close the conveyance path by reciprocating the operation unit in the right-left direction. Further, since an operator can operate the operation unit from the lateral side of the grass cutter, it is possible to easily operate the operation unit.

According to a preferred embodiment of the grass cutter, the link mechanism includes a biasing unit directly or indirectly applying a biasing force to the closing plate so that the closing plate is maintained with the conveyance path open.

This configuration makes it possible to maintain the closing plate with the conveyance path open by the closing plate without constantly applying force to the operation unit by an operator.

According to a preferred embodiment of the grass cutter, the link mechanism includes a lock mechanism directly or indirectly locking the closing plate so that the closing plate is maintained with the conveyance path closed.

This configuration makes it possible to maintain the closing plate with the conveyance path closed by the closing plate without constantly applying force to the operation unit by an operator.

According to a preferred embodiment of the grass cutter, the link mechanism includes a biasing unit biasing the operation unit so that the closing plate is maintained with the conveyance path open, and a lock mechanism locking the operation unit so that the closing plate is maintained with the conveyance path closed.

This configuration makes it possible to maintain the closing plate with the conveyance path open by the closing plate without constantly applying force to the operation unit by an operator. Further it is possible to maintain the closing plate with the conveyance path closed by the closing plate without constantly applying force to the operation unit by an operator.

According to a preferred embodiment of the grass cutter, the lock mechanism includes a first lock member formed on the operation unit, and a second lock member abutting against the first lock member when the conveyance path is closed by the closing plate to prevent movement of the operation unit in a biasing direction caused by the biasing unit.

This configuration makes it possible to maintain the closing plate with the conveyance path closed by the closing plate without constantly applying force to the operation unit by an operator.

According to a preferred embodiment of the grass cutter, the second lock member is formed in a plate-like shape whose faces are perpendicular to a movement direction of the operation unit and includes a through hole allowing the first lock member to pass from one face side to the other face side of the second lock member when the operation unit moves.

This configuration makes it possible to allow the first lock member to abut against the second lock member to prevent the operation unit from moving in the biasing direction without a complicated operation of the operation unit.

According to a preferred embodiment of the grass cutter, the operation unit is disposed in a manner to align a longitudinal direction of the operation unit with a right-left direction and includes a grasping portion on an outer side in the right-left direction.

This configuration enables an operator to operate the operation unit from the lateral side of the grass cutter. Therefore, it is possible to easily operate the operation unit.

According to a preferred embodiment of the grass cutter, the link mechanism turns the closing plate so as to open the conveyance path by the closing plate when the operation unit moves in a first direction for separating the grasping portion from the duct, and turns the closing plate so as to close the conveyance path by the closing plate when the operation unit moves in a second direction opposite to the first direction.

This configuration enables an image of the movement direction of the operation unit to easily match an image of the opening/closing of the conveyance path. Therefore, it is possible to prevent an operator from operating the operation unit in a wrong direction.

According to a preferred embodiment of the grass cutter, the grasping portion extends in a direction orthogonal to a movement direction of the operation unit.

This configuration enables an operator to easily grasp the operation unit. Accordingly, it is possible to improve the operability of the operation unit.

BRIEF DESCRIPTION OF DRAWINGS

FIG. 5 is a rear upper perspective view illustrating a duct, a duct opening/closing lid, a link mechanism and the like;

FIG. 6 is a left rear perspective view illustrating the link mechanism and the like;

Figure 1:
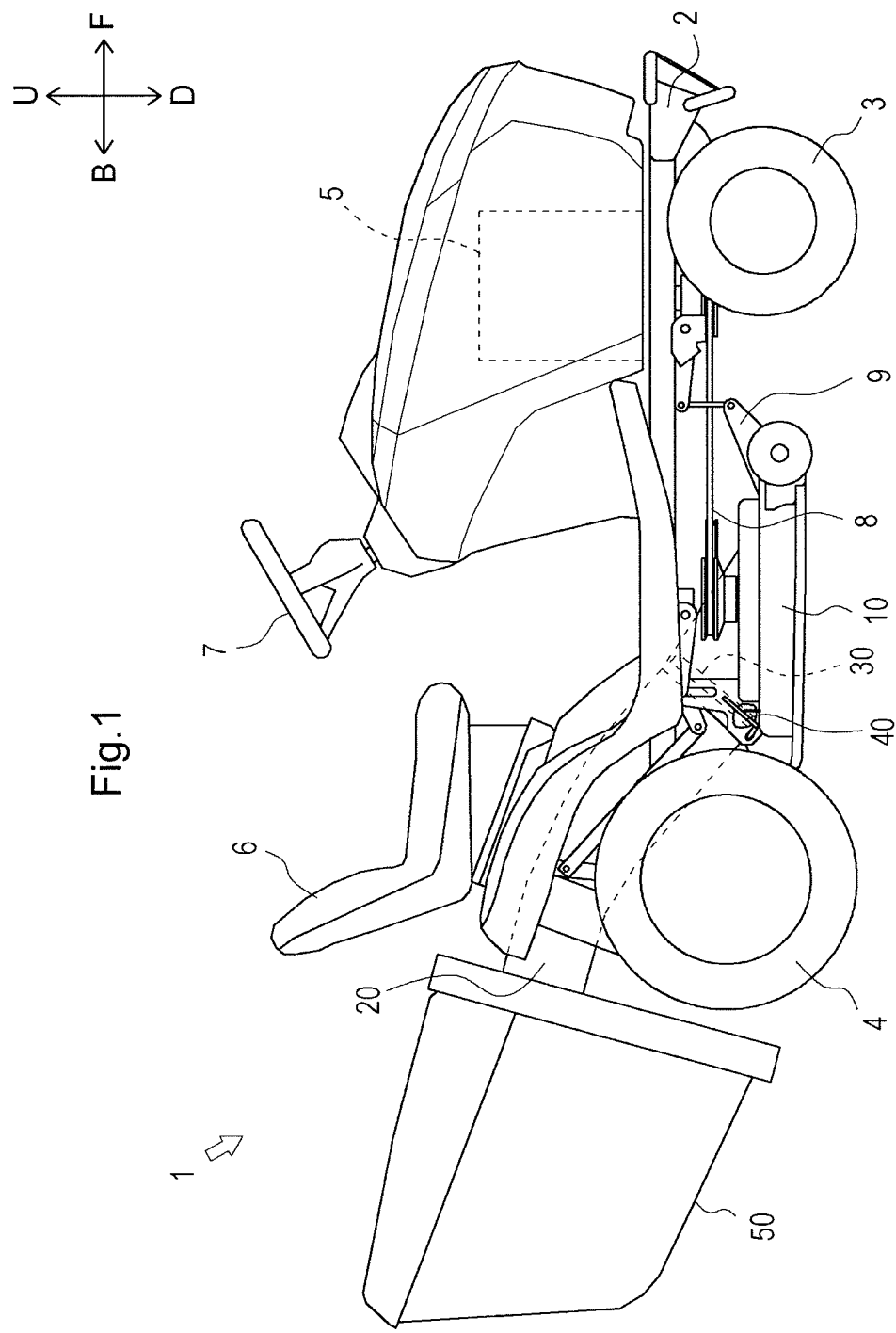
FIG. 1 is a side view illustrating a grass cutter which is an example of the disclosure.
Figure 2:
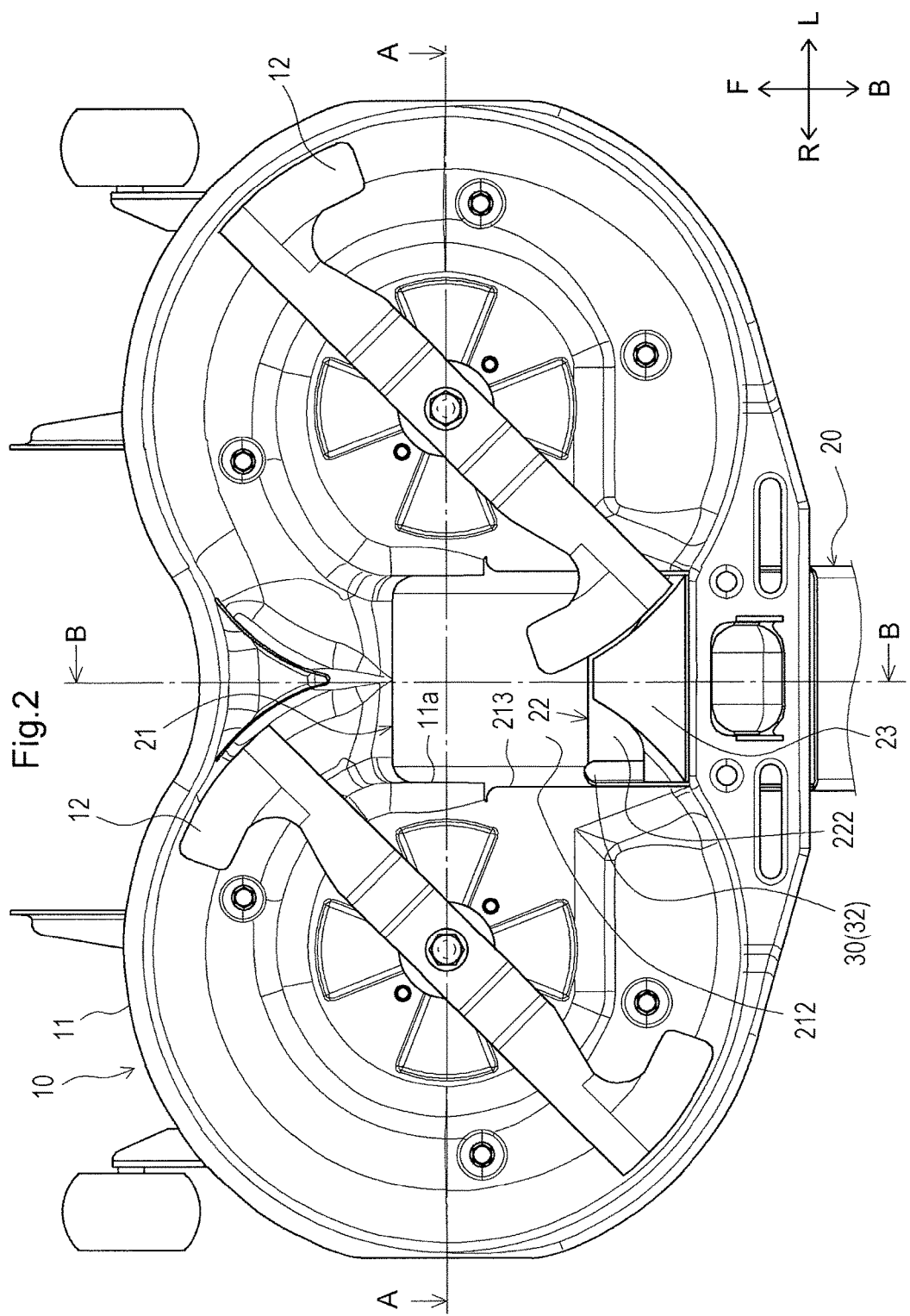
FIG. 2 is a bottom view illustrating a mower.

First, the entire configuration of the grass cutter 1 will be described with reference to FIG. 1.

The grass cutter 1 is a working vehicle capable of cutting grass (lawn) while traveling. The grass cutter 1 is mainly provided with a traveling machine body 2, a pair of right and left front wheels 3, a pair of right and left rear wheels 4, an engine 5, a driver seat 6, a handle 7, a power transmission mechanism 8, a mower link mechanism 9, a mower 10, a duct 20, a duct opening/closing lid 30, a link mechanism 40, and a grass collector 50.

The front part of the traveling machine body 2 is supported by the pair of right and left front wheels 3. The rear part of the traveling machine body 2 is supported by the pair of right and left rear wheels 4. The engine 5 is disposed in the front part of the traveling machine body 2. The driver seat 6 on which an operator sits is disposed in a front-rear intermediate part of the traveling machine body 2. The handle 7 is disposed in front of the driver seat 6.

The power transmission mechanism 8, the mower link mechanism 9, and the mower 10 are disposed under the traveling machine body 2. A control lever (not illustrated) is disposed beside the driver seat 6. The mower link mechanism 9 is coupled to the mower 10. The control lever is coupled to the mower link mechanism 9.

The mower 10 is used for performing a grass-cutting operation using the power of the engine 5. The mower 10 is attached to the traveling machine body 2 through the mower link mechanism 9. The power transmission mechanism 8 couples the engine 5 and the mower 10 to each other, and transmits the power of the engine 5 to the mower 10. The duct 20 is disposed behind the mower 10 in communication with the mower 10. The grass collector 50 is disposed behind the duct 20 in communication with the duct 20. Grass clippings cut by the mower 10 pass through the duct 20 and are then collected into the grass collector 50.

The duct opening/closing lid 30 is disposed in an intermediate part in the front-rear direction of the duct 20. The duct opening/closing lid 30 opens and closes the duct 20. The link mechanism 40 is coupled to the duct opening/closing lid 30. The link mechanism 40 is disposed outside the duct 20.

An operator can perform a grass-cutting operation (lawn-cutting operation) by driving the mower 10. Further, an operator can adjust the position in the up-down direction of the mower 10 by operating the control lever.

Further, an operator can open and close the duct 20 by the duct opening/closing lid 30 by operating the link mechanism 40. Grass clippings can be collected into the grass collector 50 through the duct 20 by opening the duct 20. On the other hand, grass clippings can be discharged to the lower side of the mower 10 by closing the duct 20.

Next, the configuration of the mower 10 will be described with reference to FIGS. 1 to 4.

The mower 10 is a working machine which cuts grass growing under the mower 10 so as to have a predetermined length (height). The mower 10 is disposed at substantially the center of the traveling machine body 2 as well as under the traveling machine body 2. The mower 10 is mainly provided with a mower deck 11, a pair of right and left rotary blades 12, and a pair of right and left fans 13.

The mower deck 11 forms a main structure of the mower 10. The mower deck 11 is formed in a bilaterally symmetrical shape, specifically, a generally laterally-facing "eight" shape in plan view. The mower deck 11 is provided with upper and side wall surfaces. The mower deck 11 is open downward. That is, the mower deck 11 is formed in a generally eight-like box shape open downward in plan view. A duct communication portion 11a is formed on the mower deck 11.

The duct communication portion 11a communicates with the duct 20 (described below). The duct communication portion 11a is formed in a generally rectangular tubular shape obliquely extending upward and rearward from the upper face of the mower deck 11. The duct communication portion 11a is formed at a central position in the right-left direction of the mower deck 11.

The rotary blades 12 are used for cutting grass and, at the same time, generating carrier air for conveying the cut grass clippings rearward by being driven to rotate. Each of the rotary blades 12 is formed in a generally rectangular plate-like shape. The rotary blades 12 are housed inside the mower deck 11. The rotary blades 12 are disposed on the right and left sides of the mower deck 11.

Figure 3:
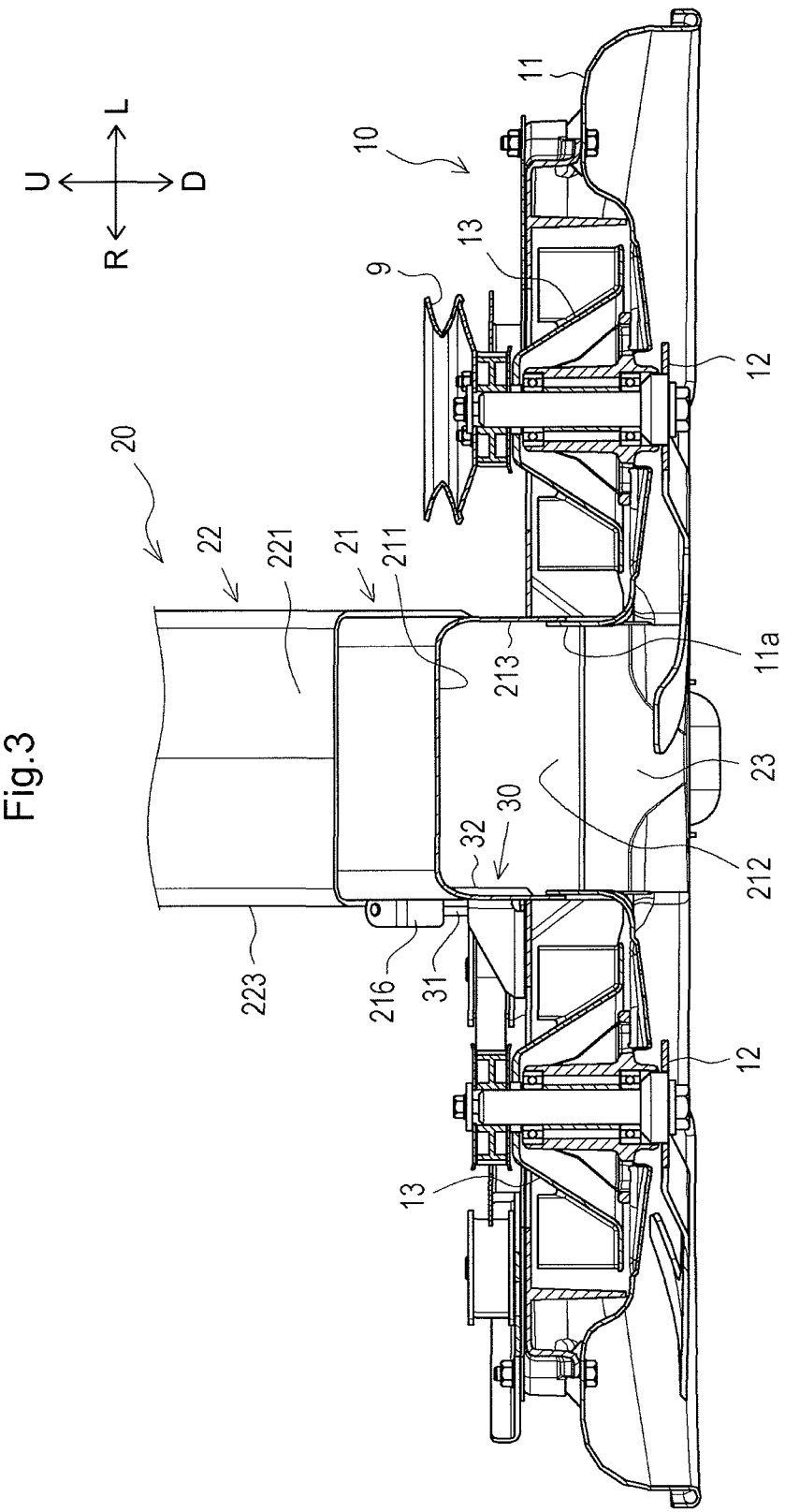
FIG. 3 is a cross-sectional view taken along line A-A in FIG. 2.
Figure 4:
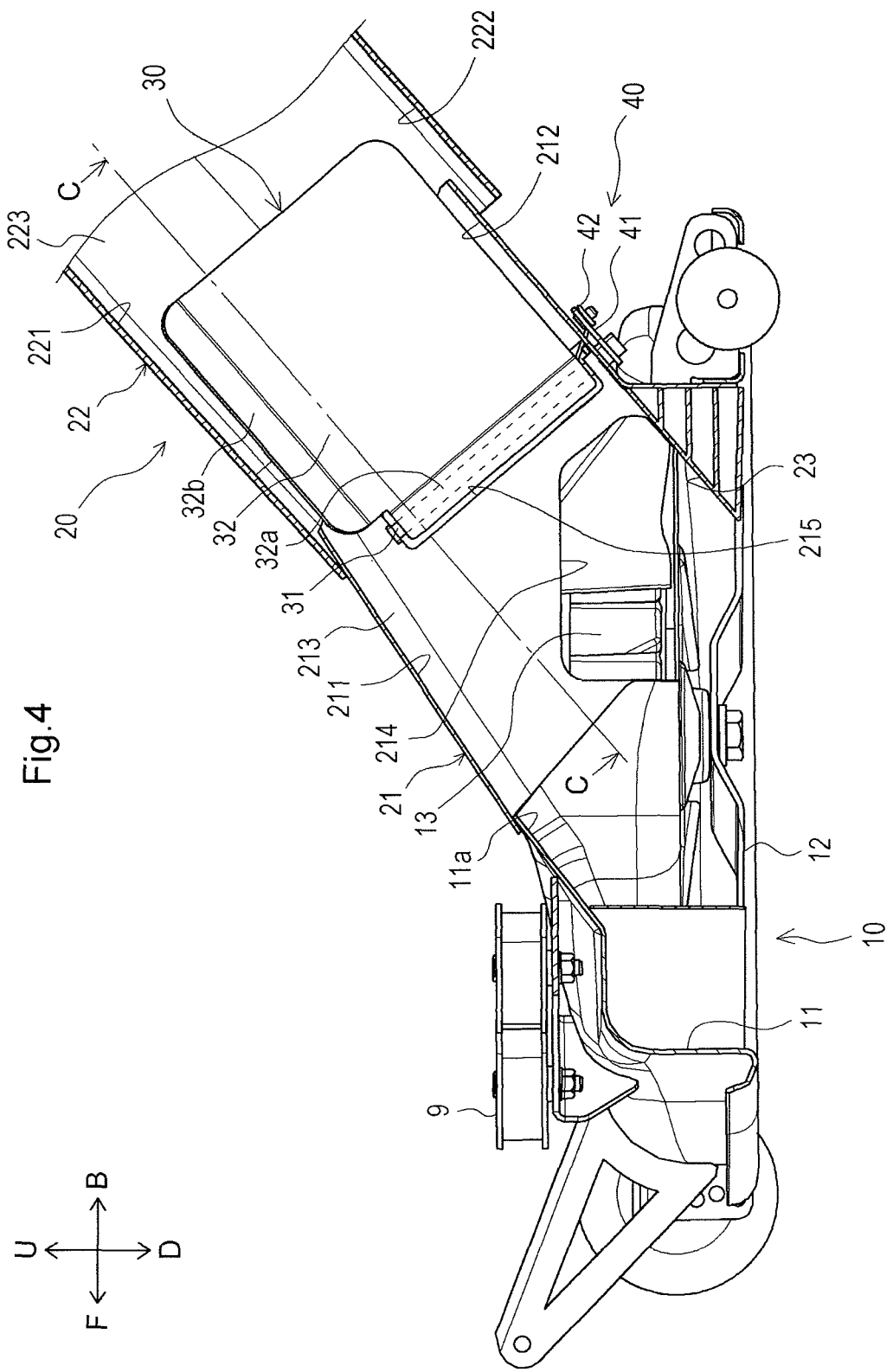
FIG. 4 is a cross-sectional view taken along line B-B in FIG. 2.

The fans 13 illustrated in FIGS. 3 and 4 generate carrier air for conveying grass clipping rearward. The fans 13 are placed on the upper face of the mower deck 11 on the right and left sides of the mower deck 11. Each of the fans 13 is disposed in a manner to align the axis of the fan 13 with the axis of the corresponding each of the rotary blades 12.

Next, the configuration of the duct 20 will be described with reference to FIGS. 2 to 8 and 10.

The duct 20 conveys grass clippings cut by the rotary blades 12 rearward. The duct 20 is mainly provided with a mower side duct 21, a grass collector side duct 22, and a guide member 23.

The mower side duct 21 forms the front part (the part located closer to the mower deck 11) of the duct 20. The mower side duct 21 is a hollow member which extends in a conveyance direction of grass clippings (obliquely extends upward and rearward). The mower side duct 21 is formed in a generally rectangular tubular shape. The front end of the mower side duct 21 communicates with the rear end of the duct communication portion 11a of the mower deck 11. The mower side duct 21 is provided with an upper wall 211, a bottom wall 212, right and left side walls 213, first openings 214, a second opening 215, a first support 216, and a second support 217.

The upper wall 211 is a plate-like portion which forms the upper part of the mower side duct 21. The upper wall 211 obliquely extends upward and rearward from a position near the rear end of an upper wall of the duct communication portion 11a.

The bottom wall 212 is a plate-like portion which forms the bottom part of the mower side duct 21. The bottom wall 212 is inclined with respect to the horizontal direction so as to obliquely extend from the lower-front side toward the upper-rear side.

The side walls 213 are plate-like portions which form the right and left side parts of the mower side duct 21. The side walls 213 couple the upper wall 211 and the bottom wall 212 to each other on their right and left ends. The side walls 213 are substantially parallel to the front-rear direction. The side walls 213 are formed at positions facing the respective fans 13.

The first openings 214 illustrated in FIG. 4 are used for introducing carrier air generated by the fans 13 into the duct 20. The first openings 214 are formed on the respective right and left side walls 213 of the mower side duct 21. The first openings 214 penetrate the respective side walls 213 in the right-left direction. Each of the first openings 214 is formed in a generally rectangular shape by notching the lower end of the corresponding side wall 213 upward.

Figure 5:
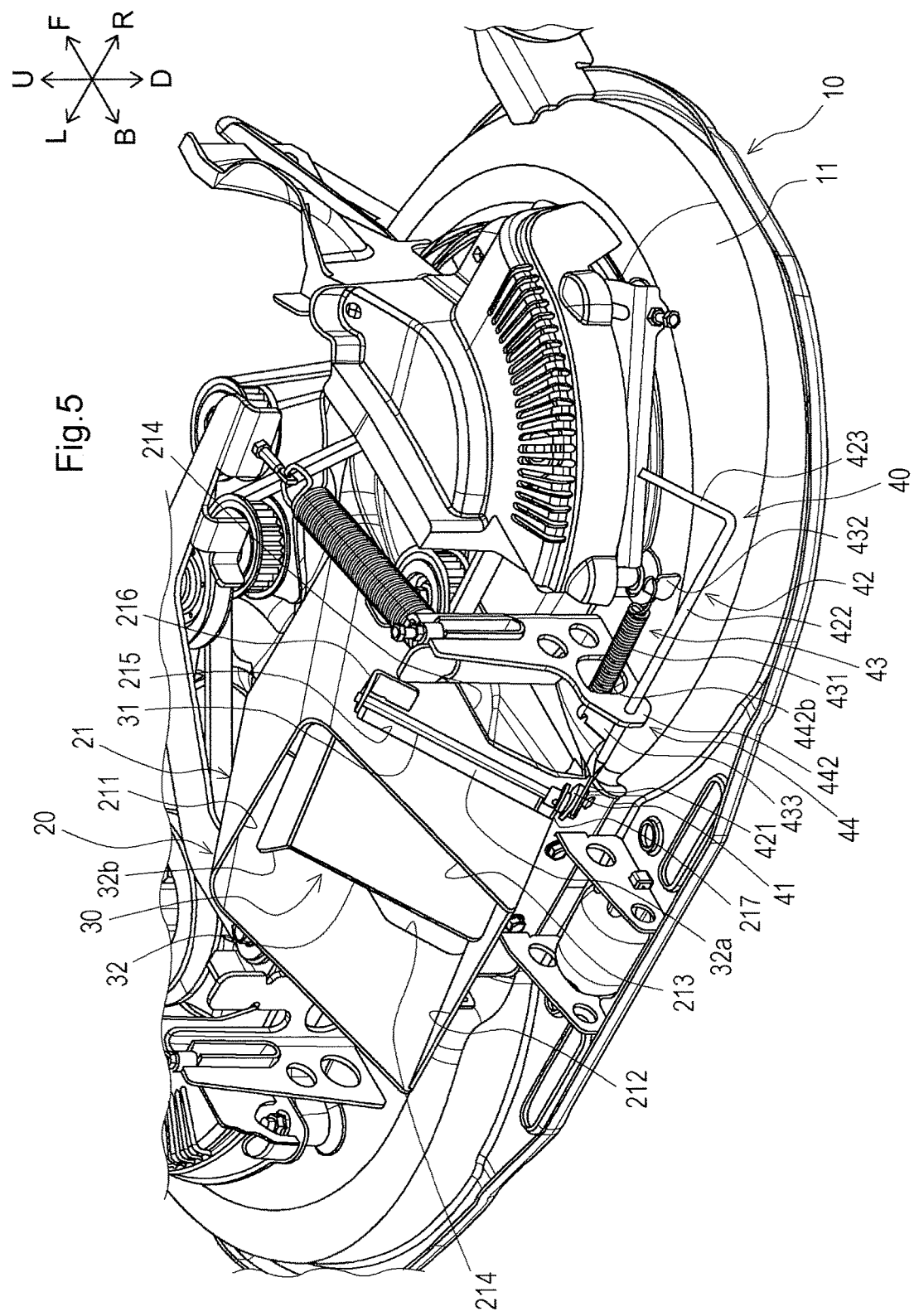

The second opening 215 illustrated in FIGS. 4 and 5 is formed on the right side wall 213 of the mower side duct 21. The second opening 215 has a continuous periphery in the exemplary showing in the drawings and, more specifically, the opening is formed in a generally rectangular shape in side view. The second opening 215 is formed in a manner to align the longitudinal direction of the second opening 215 with a direction substantially perpendicular to the bottom wall 212 of the mower side duct 21. The second opening 215 penetrates the right side wall 213 in the right-left direction. The second opening 215 is formed near the rear end of the mower side duct 21.

The first support 216 illustrated in FIGS. 3, 5, and 7 supports the upper end of a turning shaft 31 (described below). The first support 216 is formed in an L plate-like shape. The first support 216 is disposed in such a manner that one face of the first support 216 is substantially parallel to the bottom wall 212 of the mower side duct 21. The first support 216 is disposed on the outer face of the right side wall 213 of the mower side duct 21. The first support 216 is disposed near the upper end of the second opening 215.

The second support 217 illustrated in FIGS. 5 to 8 supports the lower end of the turning shaft 31 (described below). The second support 217 is formed in a plate-like shape projecting rightward from the lower end of the right side wall 213 of the mower side duct 21. The second support 217 is parallel to the bottom wall 212 of the mower side duct 21. The second support 217 is disposed near the lower end of the second opening 215.

The grass collector side duct 22 illustrated in FIGS. 3 and 4 forms the rear part (the part located closer to the grass collector 50) of the duct 20. The grass collector side duct 22 is a hollow member which extends in the conveyance direction of grass clippings. The grass collector side duct 22 is formed in a generally rectangular tubular shape. The front end of the grass collector side duct 22 communicates with the rear end of the mower side duct 21. The grass collector side duct 22 is provided with an upper wall 221, a bottom wall 222, and side walls 223.

The upper wall 221 is a plate-like portion which forms the upper part of the grass collector side duct 22. The upper wall 221 obliquely extends upward and rearward from a position near the rear end of the upper wall 211 of the mower side duct 21.

The bottom wall 222 is a plate-like portion which forms the bottom part of the grass collector side duct 22. The bottom wall 222 is inclined with respect to the horizontal direction so as to obliquely extend upward and rearward from a position near the rear end of the bottom wall 212 of the mower side duct 21. The front part of the bottom wall 222 is substantially parallel to the bottom wall 212 of the mower side duct 21.

The side walls 223 are plate-like portions which form the right and left side parts of the grass collector side duct 22. The side walls 223 couple the upper wall 221 and the bottom wall 222 to each other on their right and left ends. The side walls 223 are substantially parallel to the front-rear direction.

As described above, the duct 20 is formed in a rectangular tubular shape obliquely extending upward and rearward by the upper wall 211, the bottom wall 212 and the side walls 213 of the mower side duct 21, and the upper wall 221, the bottom wall 222 and the side walls 223 of the grass collector side duct 22. A conveyance path for grass clippings is formed inside the duct 20 having such a configuration. That is, the upper wall 211 of the mower side duct 21 and the upper wall 221 of the grass collector side duct 22 cover the conveyance path for grass clippings from the upper side. The bottom wall 212 of the mower side duct 21 and the bottom wall 222 of the grass collector side duct 22 cover the conveyance path for grass clippings from the lower side. The side walls 213 of the mower side duct 21 and the side walls 223 of the grass collector side duct 22 cover the conveyance path for grass clippings from the lateral sides. The conveyance path for grass clippings is inclined by approximately 45° with respect to the horizontal direction near the communication part between the mower side duct 21 and the grass collector side duct 22 (near a position at which the duct opening/closing lid 30 (described below) is disposed).

The guide member 23 illustrated in FIGS. 2 to 4, and 10 is a member for guiding carrier air generated by the rotary blades 12 and carrier air generated by the fans 13 in the conveyance direction of the grass clippings. The guide member 23 is formed in a generally triangular prism shape. The guide member 23 is disposed in such a manner that triangular faces of the triangular prism (the bottom faces of the triangular prism) face the right and left directions. The guide member 23 is disposed at a central position in the right-left direction inside the mower deck 11. The lower part of each of the triangular faces of the triangular prism is notched toward the center in the right-left direction so as to prevent contact with the rotary blades 12 (refer to FIGS. 2 and 3). The guide member 23 is formed in such a manner that the upper face of the guide member 23 obliquely extends downward and forward in continuous with the lower end part of the bottom wall 212 of the mower side duct 21. The upper face of the guide member 23 is substantially parallel to the bottom wall 212.

Next, the configuration of the duct opening/closing lid 30 will be described with reference to FIGS. 4 to 8, 10, and 11. Hereinbelow, a state in which the duct 20 is open by the duct opening/closing lid 30 will be described.

The duct opening/closing lid 30 opens and closes the duct 20. Specifically, the duct opening/closing lid 30 opens and closes the conveyance path for grass clippings formed inside the duct 20 (hereinbelow, referred to as "opening and closing the duct 20"). The duct opening/closing lid 30 is provided with the turning shaft 31 and a closing plate 32.

The turning shaft 31 serves as a turning center of the closing plate 32 (described below). The turning shaft 31 is disposed in a manner to align the axis of the turning shaft 31 with an oblique direction extending from the upper-front side toward the lower-rear side as well as to be substantially perpendicular to the conveyance direction of grass clippings. The turning shaft 31 is disposed on the outer side of the duct 20. Specifically, the turning shaft 31 is disposed along the outer face of the right side wall 213 of the mower side duct 21. The turning shaft 31 is disposed near the rear end part of the mower side duct 21 (near the communication part between the mower side duct 21 and the grass collector side duct 22). The upper end of the turning shaft 31 is supported by the first support 216. The lower end of the turning shaft 31 is supported by the second support 217. The turning shaft 31 is turnably supported around the axis of the turning shaft 31 with respect to the first support 216 and the second support 217.

The closing plate 32 turns to open and close the duct 20. The closing plate 32 is formed in a generally rectangular plate-like shape. The closing plate 32 is disposed along the inner face of the right side wall 213 of the mower side duct 21. The closing plate 32 is disposed that the upper and lower ends of the closing plate 32 are substantially parallel to the bottom wall 212 of the mower side duct 21. The closing plate also includes a first side end proximate the axis of the turning shaft 31, and a second side end more greatly spaced than the first side end from the axis of the turning shaft. The second side end of the closing plate is positioned within the duct in both the open position and the closed position of the closing plate, and the second side end of the closing plate is positioned within the duct in both the open position and the closed position of the closing plate. The closing plate 32 is disposed that the lower end of the closing plate 32 is separated from the inner face of the bottom wall 212 (that is, a gap g is formed between the lower end of the closing plate 32 and the inner face of the bottom wall 212 as illustrated in FIG. 7). A fixation portion 32a, which includes the aforementioned first side end, and a bent portion 32b are formed on the closing plate 32.

Figure 10:
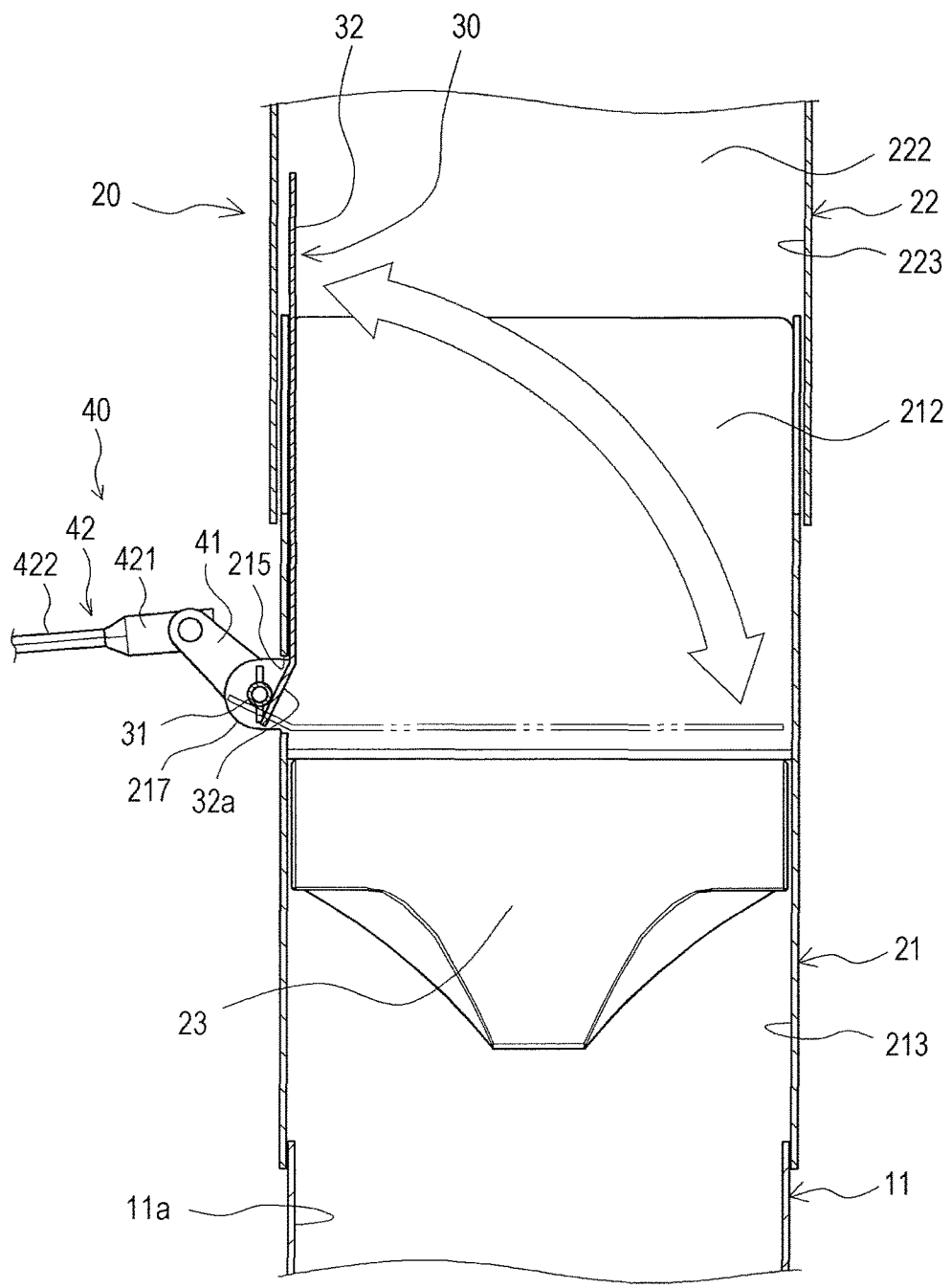
FIG. 10 is a cross-sectional view taken along line C-C in FIG. 4.

The fixation portion 32a illustrated in FIGS. 4, 10 and the like is fixed to the turning shaft 31. The fixation portion 32a is a bent portion of the closing plate formed by bending the front end (between the vicinity of the upper end of the front end and the lower end) of the closing plate 32 rightward and forward. The fixation portion 32a extends from a remainder portion of the closing plate and passes through the second opening 215 of the mower side duct 21 and extends from the inside to the outside of the mower side duct 21. An outer face (right face) in the right-left direction of the fixation portion 32a is fixed to the turning shaft 31.

The bent portion 32b illustrated in FIGS. 4, 5, 7, and 11 guides grass clippings downward. The bent portion 32b is formed by bending the upper end of the closing plate 32 toward the center in the right-left direction of the mower side duct 21 (leftward). The upper end of the bent portion 32b is located close to the upper wall 211 of the mower side duct 21 when the duct 20 is closed by the closing plate 32 (refer to FIGS. 7 and 11).

Next, the configuration of the link mechanism 40 will be described with reference to FIGS. 4 to 8, and 10.

The link mechanism 40 turns the closing plate 32 of the duct opening/closing lid 30. The link mechanism 40 is provided with a coupling member 41, an operation unit 42, a biasing unit 43, and a lock mechanism 44.

The coupling member 41 is coupled to the turning shaft 31. The coupling member 41 is formed in a generally rectangular plate-like shape. Both ends in the longitudinal direction of the coupling member 41 are formed in a circular arc shape. The coupling member 41 is disposed in substantially parallel to the bottom wall 212 of the mower side duct 21. The vicinity of the front end of the coupling member 41 is fixed to the vicinity of the lower end of the turning shaft 31 at a position under the second support 217.

The operation unit 42 illustrated in FIGS. 5 to 8 operates the coupling member 41. The operation unit 42 is disposed at the right side of the duct 20. The operation unit 42 is capable of reciprocating in the right-left direction. The operation unit 42 is provided with a plate-like portion 421, a rod 422, and a grasping portion 423.

The plate-like portion 421 is coupled to the coupling member 41. The plate-like portion 421 is formed in a generally rectangular shape. The plate-like portion 421 is disposed in such a manner that the upper face (front face) of the plate-like portion 421 abuts against the lower face (rear face) of the coupling member 41. The vicinity of the left end of the plate-like portion 421 is coupled to the vicinity of the rear end of the coupling member 41 through a coupling shaft. The plate-like portion 421 is turnably coupled around the axis of the coupling shaft.

The rod 422 is formed in a rod-like shape extending substantially rightward from the right end of the plate-like portion 421. The right end of the rod 422 is located near the right end of the mower deck 11.

The grasping portion 423 is grasped by an operator when the operator operates the operation unit 42. The grasping portion 423 is formed in a rod-like shape continuous with the right end of the rod 422. The grasping portion 423 is orthogonal to the rod 422 and extends upward and forward.

The biasing unit 43 illustrated in FIGS. 5 to 8 is used for maintaining the closing plate 32 with the duct 20 open. The biasing unit 43 is provided with a spring 431, a first hook member 432, and a second hook member 433.

The spring 431 biases the operation unit 42. The spring 431 is a tension spring. The spring 431 is disposed in such a manner that the expansion direction is substantially parallel to the right-left direction.

The first hook member 432 is used for hooking the right end of the spring 431. The first hook member 432 is formed in a generally rectangular plate-like shape. The first hook member 432 is formed on the upper face of the mower deck 11 in parallel to the right-left direction. A notch 432a is formed on the right end of the first hook member 432 by notching the first hook member 432 leftward from the right end. The right end of the spring 431 is hooked onto the notch 432a.

The second hook member 433 is used for hooking the left end of the spring 431. The second hook member 433 is formed in a generally rectangular plate-like shape. The second hook member 433 extends substantially forward from a position near the left end of the rod 422 (refer to FIGS. 6 and 7). A notch 433a is formed on the left end of the second hook member 433 by notching the second hook member 433 rightward from the left end. The left end of the spring 431 is hooked onto the notch 433a.

The spring 431 is first hooked onto the first hook member 432 on the right end, and then, in an elongated state in the right-left direction, hooked onto the notch 433a on the left end. Accordingly, the spring 431 biases the operation unit 42 rightward by the contractive force. Accordingly, the coupling member 41 turns in a clockwise direction (in FIG. 8) around the axis of the turning shaft 31 together with the turning shaft 31. The turn of the turning shaft 31 allows the closing plate 32 fixed to the turning shaft 31 to turn in the clockwise direction (in FIG. 8) around the axis of the turning shaft 31. As a result, the closing plate 32 is maintained with the duct 20 open.

The lock mechanism 44 locks the closing plate 32 through the operation unit 42 so as to maintain the closing plate 32 with the duct 20 closed. The lock mechanism 44 is provided with a first lock member 441 and a second lock member 442.

The first lock member 441 is formed on the operation unit 42 to restrict movement of the operation unit 42. The first lock member 441 is formed in a generally rectangular plate-like shape. The first lock member 441 is parallel to the bottom wall 212 of the mower side duct 21. The first lock member 441 extends downward and forward from an intermediate part in the right-left direction of the rod 422. The first lock member 441 is located on the right side with respect to the second hook member 433. A projection 441a which projects rightward is formed on the lower part of the right end of the first lock member 441.

The second lock member 442 abuts against the first lock member 441 to prevent movement of the operation unit 42 in a biasing direction caused by the biasing unit 43. The second lock member 442 is formed in a generally L plate-like shape. One face of the second lock member 442 is perpendicular to the movement direction (right-left direction) of the operation unit 42. The face of the second lock member 442 is located between the second hook member 433 and the first lock member 441 in the right-left direction when the duct 20 is open by the closing plate 32. A notch 442a, a first through hole 442b, and a second through hole 442c are formed on the second lock member 442.

Figure 6:
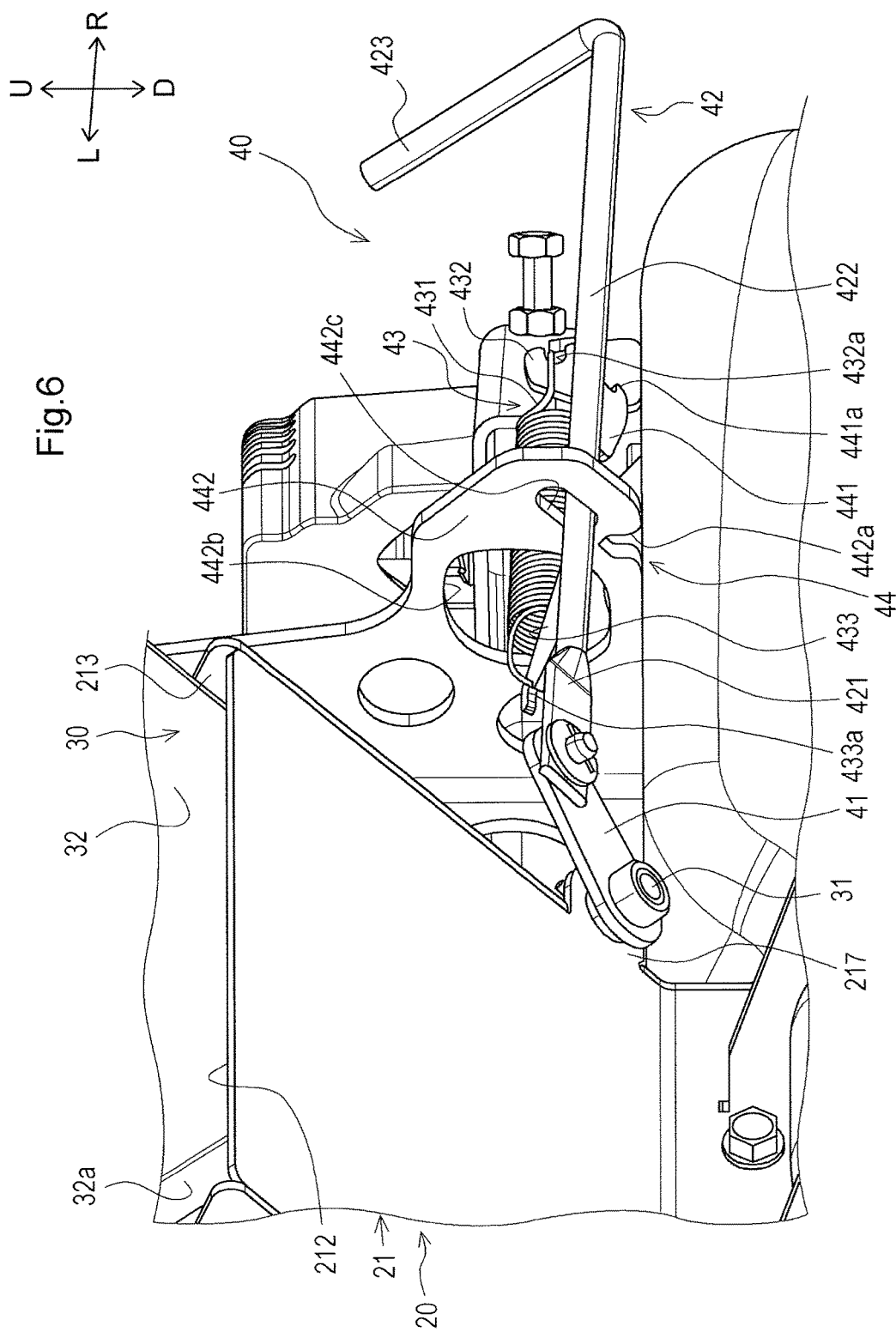

The notch 442a illustrated in FIG. 6 locks the projection 441a of the first lock member 441. The notch 442a is formed by notching the lower end of the second lock member 442 upward.

The first through hole 442b illustrated in FIG. 6 is used for inserting the spring 431. The first through hole 442b penetrates the second lock member 442 in the right-left direction. The first through hole 442b is formed in a generally rectangular shape in side view.

The second through hole 442c illustrated in FIG. 6 is used for inserting the rod 422 and the first lock member 441. The second through hole 442c penetrates the second lock member 442 in the right-left direction. The second through hole 442c is formed in a long hole shape. The second through hole 442c is parallel to the bottom wall 212 of the mower side duct 21 in the longitudinal direction of the second through hole 442c.

Next, an operation of opening and closing the duct 20 performed by the closing plate 32 of the duct opening/closing lid 30 will be described with reference to FIGS. 5 to 11.

As described above, the operation unit 42 is biased rightward by the spring 431. Accordingly, the closing plate 32 is maintained with the duct 20 open. In order to close the duct 20, an operator grasps the grasping portion 423 of the operation unit 42 and moves the operation unit 42 leftward. At this point, the rod 422 and the first lock member 441 pass through the second through hole 442c and the first lock member 441 thereby moves from the right side to the left side of the second lock member 442. The coupling member 41 turns in a counterclockwise direction (in FIG. 8) around the axis of the turning shaft 31 together with the turning shaft 31. The turn of the turning shaft 31 allows the closing plate 32 fixed to the turning shaft 31 to turn by 90° or more in the counterclockwise direction (in FIG. 8) around the axis of the turning shaft 31.

Figure 9:
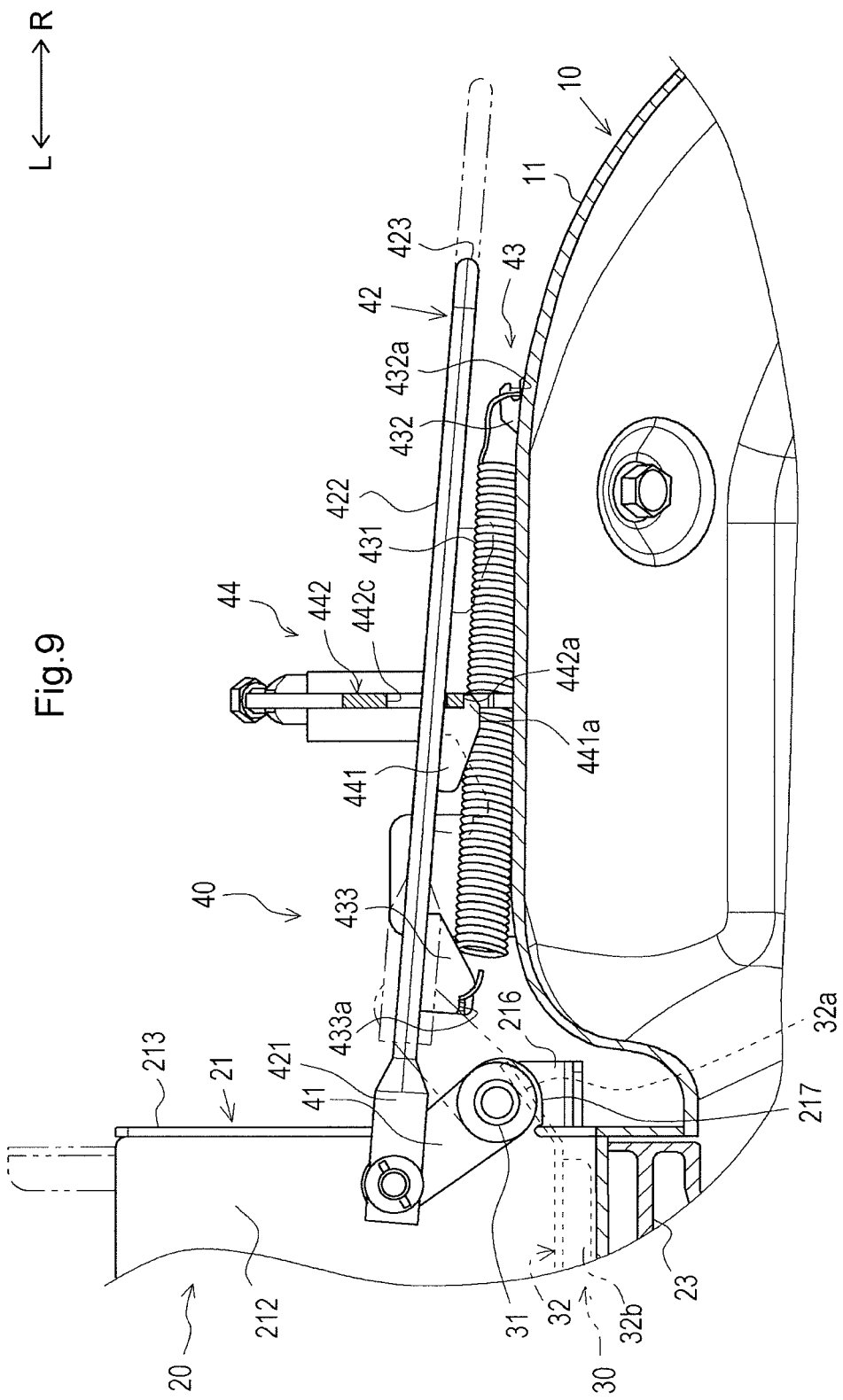
FIG. 9 is a cross-sectional view illustrating the link mechanism when a conveyance path is closed by a closing plate.

The operation unit 42 is biased rightward by the spring 431 through the second hook member 433. Therefore, when the operator stops moving the operation unit 42 leftward, the first lock member 411 which has moved to the left side of the second lock member 442 moves rightward (toward the second lock member 442). At this point, the closing plate 32 turns in the clockwise direction (in FIG. 8) around the axis of the turning shaft 31 to return to the initial position (the position for opening the duct 20). The operator pushes the grasping portion 423 downward to thereby allow the projection 441a of the first lock member 441 to be hooked onto the notch 442a of the second lock member 442. Accordingly, as illustrated in FIG. 9, the right end face of the first lock member 441 abuts against the left face of the second lock member 442. This prevents the first lock member 441 (and also the operation unit 42) from further moving rightward. As a result, the closing plate 32 is maintained at a position where the faces of the closing plate 32 are perpendicular to the conveyance direction (the position indicated by a two-dot chain line in FIGS. 7 and 10 and indicated by a broken line in FIG. 9) to close the duct 20.

At this point, the closing plate 32 is locked by the lock mechanism 44. Thus, it is possible to prevent the closing plate 32 from turning in the direction for opening the duct 20 by colliding with carrier air and grass clippings.

In order to open the duct 20 again, the operator grasps the grasping portion 423 of the operation unit 42 and slightly moves the operation unit 42 leftward, and then lifts the grasping portion 423 upward until the height of the first lock member 441 becomes equal to the height of the second through hole 442c. Accordingly, the operation unit 42 moves rightward by a rightward biasing force of the spring 431. At this point, the first lock member 441 passes through the second through hole 442c and moves to the right side of the second lock member 442. When the closing plate 32 turns in the clockwise direction (in FIG. 8) around the axis of the turning shaft 31 and thereby abuts against the right side wall 213 of the mower side duct 21, the movement of the operation unit 42 is stopped. Since the operation unit 42 is biased rightward by the spring 431, the closing plate 32 is maintained with the duct 20 open.

In this state, the spring 431 constantly biases the closing plate 32 through the operation unit 42 in a direction for allowing the closing plate 32 to abut against the side wall 213. Thus, it is possible to prevent swing (flapping) of the closing plate 32. Further, since the spring 431 biases the closing plate 32 in the direction for opening the duct 20, it is possible to easily open the duct 20.

Next, the flow of grass clippings when the duct 20 is open by the closing plate 32 will be described. Grass clippings are conveyed from the mower 10 to the grass collector 50 through the duct 20 (the mower side duct 21 and the grass collector side duct 22). As described above, the turning shaft 31 is disposed on the outer side of the duct 20. Therefore, the grass clippings can be conveyed to the grass collector 50 without being obstructed by the turning shaft 31.

Next, the flow of grass clippings when the duct 20 is closed by the closing plate 32 will be described. Grass clippings are conveyed from the mower 10 to the mower side duct 21. Since the conveyance path for grass clippings is closed by the closing plate 32, the flow of carrier air in the conveyance direction of grass clippings is blocked. Thus, grass clippings are not sufficiently guided into the duct 20. Even if grass clippings are guided into the duct 20, the grass clippings collide with the closing plate 32 and are thereby returned forward (toward the mower 10 side). The grass clippings that have been returned forward are discharged to the outside from the lower side of the mower deck 11.

Figure 11:
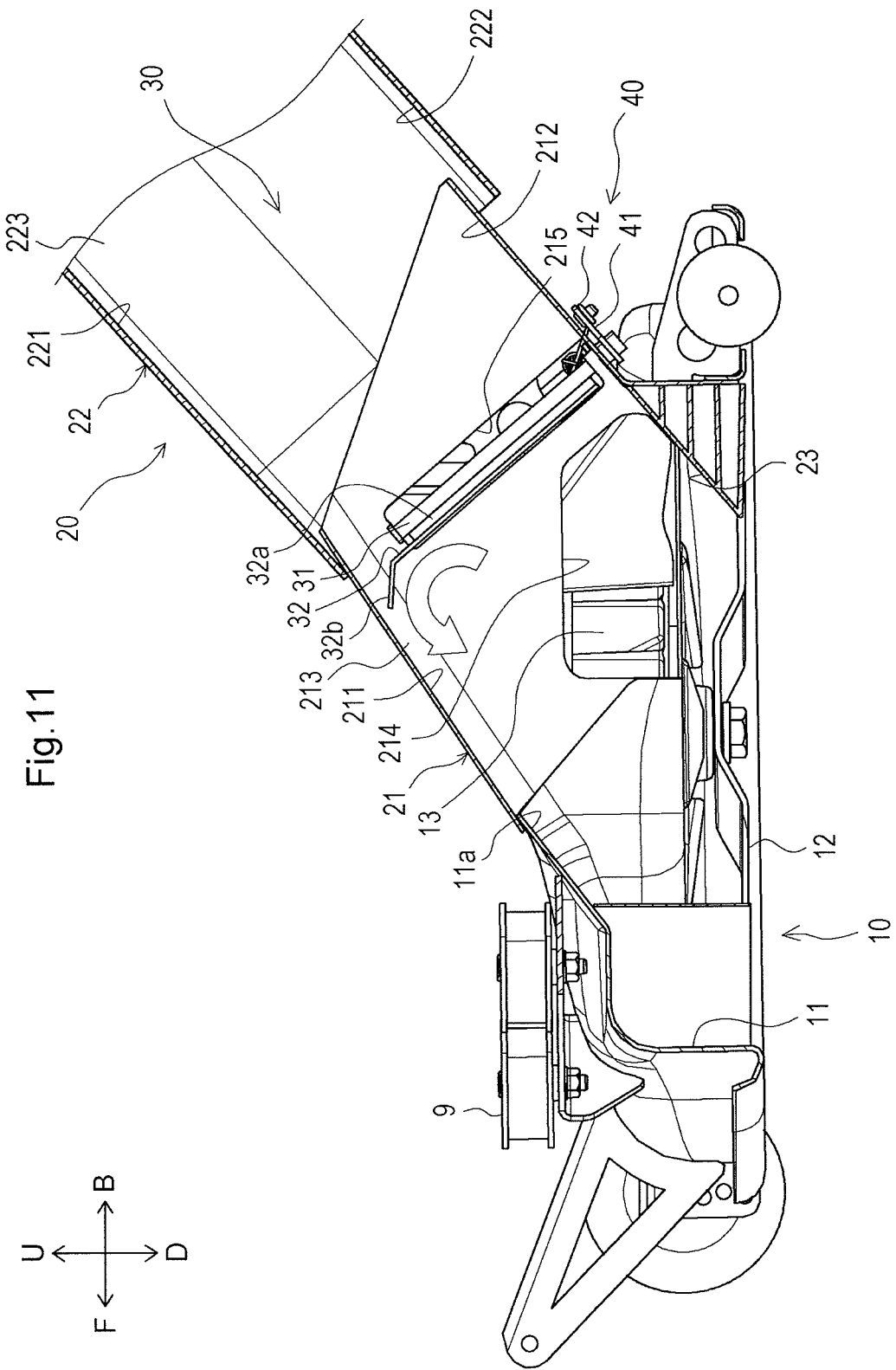
FIG. 11 is a cross-sectional view when the conveyance path is closed by the closing plate.

In this state, the bent portion 32b formed on the upper end of the closing plate 32 is bent in a direction opposite to the conveyance direction of grass clippings (refer to FIG. 11). Grass clippings conveyed through the upper part of the mower side duct 21 are guided in the direction opposite to the conveyance direction by the bent portion 32b. Specifically, the grass clippings are guided downward (toward the mower 10 side) by the bent portion 32b. Accordingly, it is possible to facilitate discharge of the grass clippings to the outside from the lower side of the mower deck 11.

Figure 7:
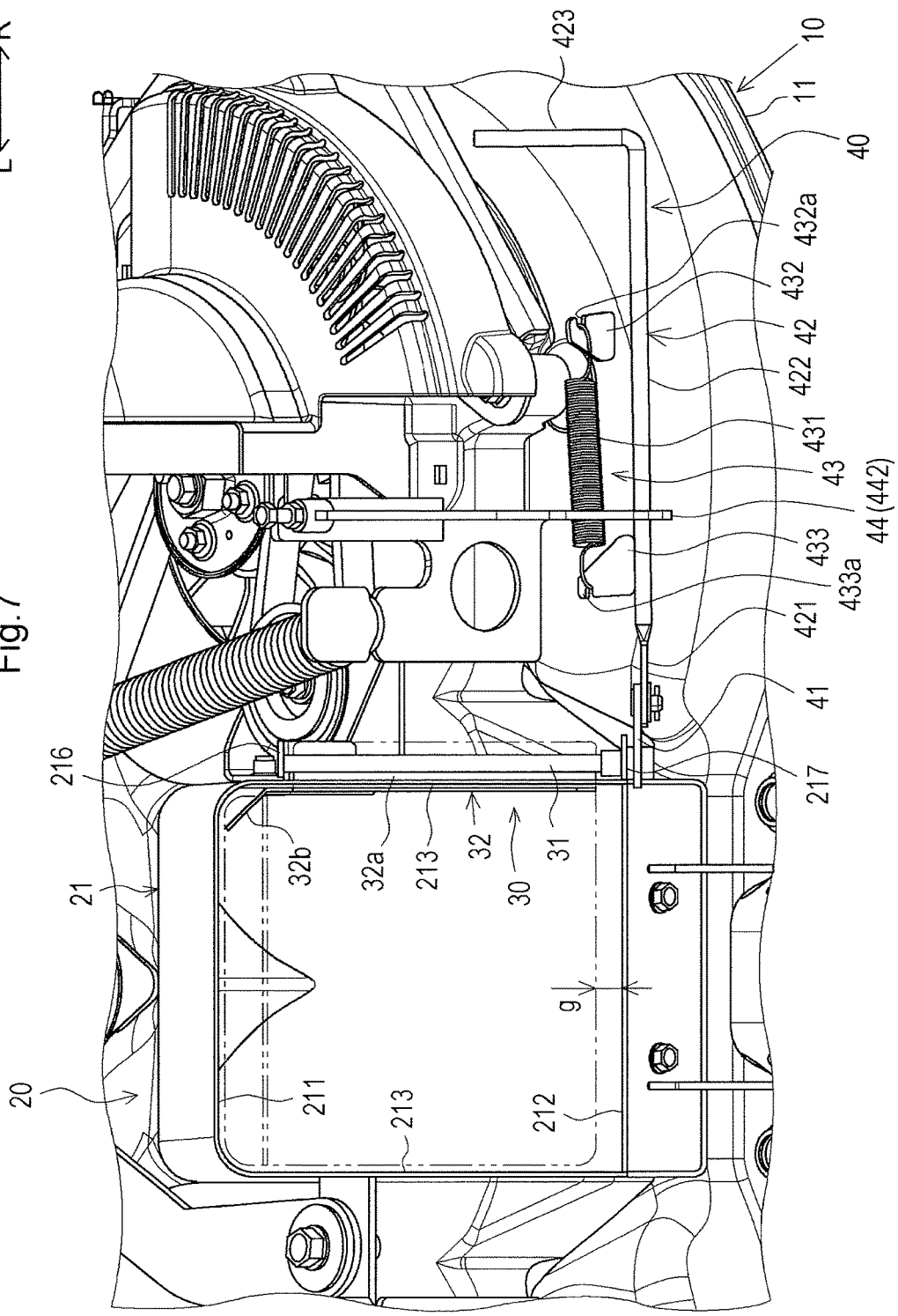
FIG. 7 is a view illustrating the duct, the duct opening/closing lid, the link mechanism and the like viewed from a direction opposite to a conveyance direction of grass clippings.
Figure 8:
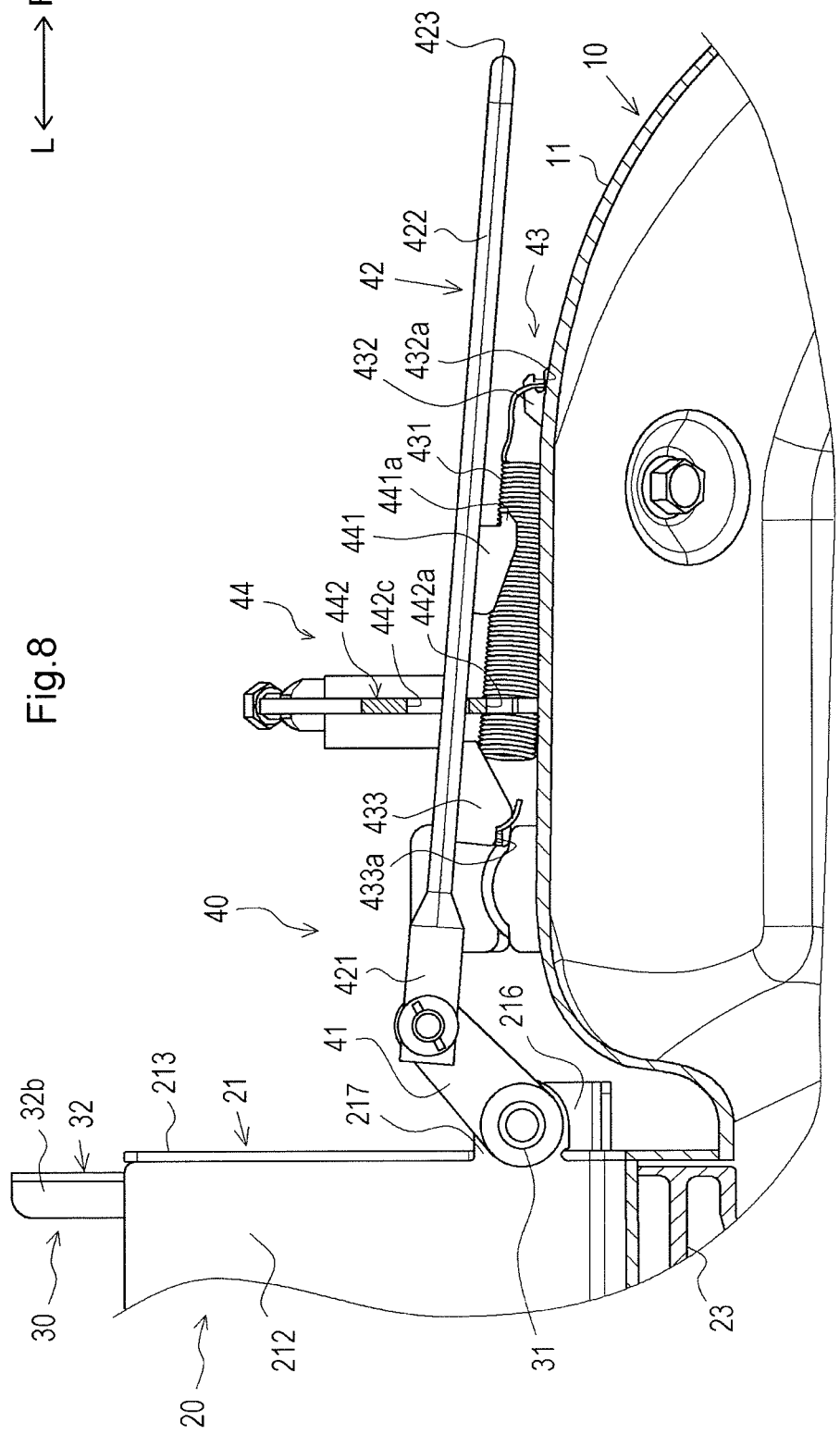
FIG. 8 is a cross-sectional view illustrating the link mechanism.

As illustrated in FIG. 7, the gap g is maintained between the lower end of the closing plate 32 and the inner face of the bottom wall 212. Some of the grass clippings that have been conveyed to the rear side of the closing plate 32 may be accumulated on the bottom wall 212 of the mower side duct 21 and the bottom wall 222 of the grass collector side duct 22 without flowing to the grass collector 50. The accumulated grass clippings obstruct the turn of the closing plate 32. In the grass cutter 1 of the present embodiment, the grass clippings can be actively returned forward (toward the mower 10 side) through the gap g. Therefore, it is possible to allow the closing plate 32 to constantly and smoothly turn.

For example, although the turning shaft 31 is disposed along the outer face of the right side wall 213 of the mower side duct 21 and the closing plate 32 is disposed along the inner face of the right side wall 213 of the mower side duct 21 (when the duct 20 is open) in the present embodiment, the disclosure is not limited to this configuration. For example, the turning shaft 31 may be disposed along the outer face of the left side wall 213 of the mower side duct 21 and the closing plate 32 may be disposed along the inner face of the left side wall 213 of the mower side duct 21 (when the duct 20 is open).

Although the operation unit 42 is disposed on the right side of the duct 20 in the present embodiment, the disclosure is not limited to this configuration. For example, the operation unit 42 may be disposed on the left side of the duct 20.

Although the duct 20 obliquely extends upward and rearward in the present embodiment, the disclosure is not limited to this configuration. For example, the duct 20 may horizontally extend rearward.

Although the link mechanism 40 is coupled to the turning shaft 31 in the present embodiment, the disclosure is not limited to this configuration. For example, the link mechanism 40 may be coupled to the closing plate 32.

Although the lock mechanism 44 locks the operation unit 42 in the present embodiment, the disclosure is not limited to this configuration. For example, the lock mechanism 44 may lock the turning shaft 31 or the closing plate 32.

Although the biasing unit 43 biases the operation unit 42 using the spring 431 in the present embodiment, the disclosure is not limited to this configuration. For example, the biasing unit 43 may bias the operation unit 42 by magnetic force.

What is claimed is:

1. A grass cutter comprising:
a duct extending in a conveyance direction of grass clippings and having a conveyance path for the grass clippings formed inside the duct;
a side wall opening formed on a side wall of the duct;
a duct opening/closing lid comprising:
   a turning shaft extending outside of and along an outer surface of the duct;
   a closing plate disposed within the conveyance path inside the duct;
   the closing plate being turnable around an axis of the turning shaft to selectively move the closing plate between an open position and a closed position to open and close the conveyance path, respectively;
   the closing plate comprising:
      a first side end proximate the axis of the turning shaft; and
      a second side end more greatly spaced than the first side end from the axis of the turning shaft;
      the second side end of the closing plate being positioned within the duct in both the open position and the closed position of the closing plate; and
      a fixation portion fixed to the turning shaft, the fixation portion extending through the side wall opening from inside the duct to outside the duct.

2. The grass cutter as claimed in claim 1, wherein:
the turning shaft is disposed substantially perpendicular to the conveyance direction for the grass clippings.

3. The grass cutter as claimed in claim 2, wherein:
the side wall covers the conveyance path from a lateral side; and
the turning shaft is disposed along an outer face of the side wall.

4. The grass cutter as claimed in claim 1, wherein:
the side wall covers the conveyance path from a lateral side; and
the turning shaft is disposed along an outer face of the side wall.

5. The grass cutter as claimed in claim 1, wherein:
the duct includes a bottom wall covering the conveyance path from a lower side; and
the closing plate is disposed in such a manner that a lower end of the closing plate is separated from an inner face of the bottom wall when the conveyance path is closed by the closing plate.

6. The grass cutter as claimed in claim 1, wherein:
an upper end of the closing plate is bent in a direction opposite to the conveyance direction of the grass clippings when the conveyance path is closed by the closing plate.

7. The grass cutter as claimed in claim 1, further comprising:
a link mechanism configured to turn the closing plate.

8. The grass cutter as claimed in claim 7, wherein:
the turning shaft is turnable around the axis of the turning shaft;
the closing plate is coupled to the turning shaft so as to turn in conjunction with turning of the turning shaft; and
the link mechanism is coupled to the turning shaft.

9. The grass cutter as claimed in claim 8, wherein:
the duct includes a bottom wall inclined with respect to a horizontal direction; and
the turning shaft is substantially perpendicular to the bottom wall.

10. The grass cutter as claimed in claim 9, wherein:
the link mechanism is coupled to a lower end of the turning shaft.

11. The grass cutter as claimed in claim 8, wherein:
the link mechanism includes a coupling member fixed to the turning shaft;
an operation unit is coupled to the coupling member, the operation unit being movable to allow the coupling member to turn around the axis of the turning shaft.

12. The grass cutter as claimed in claim 11, wherein:
the operation unit is configured to reciprocate in a right-left direction.

13. The grass cutter as claimed in claim 11, wherein:
the link mechanism includes a biasing unit directly or indirectly applying a biasing force to the closing plate so that the closing plate is maintained with the conveyance path open.

14. The grass cutter as claimed in claim 11, wherein:
the link mechanism includes a lock mechanism directly or indirectly locking the closing plate so that the closing plate is maintained with the conveyance path closed.

15. The grass cutter as claimed in claim 11, wherein:
the link mechanism comprises:
   a biasing unit biasing the operation unit so that the closing plate is maintained with the conveyance path open; and
   a lock mechanism locking the operation unit so that the closing plate is maintained with the conveyance path closed.

16. The grass cutter as claimed in claim 15, wherein:
the lock mechanism comprises:
   a first lock member formed on the operation unit; and
   a second lock member abutting against the first lock member when the conveyance path is closed by the closing plate to prevent movement of the operation unit in a biasing direction caused by the biasing unit.

17. The grass cutter as claimed in claim 16, wherein:
the second lock member is formed in a plate-like shape having faces perpendicular to a movement direction of the operation unit and includes a through hole allowing the first lock member to pass from one face side to the other face side of the second lock member when the operation unit moves.

18. The grass cutter as claimed in claim 11, wherein:
the operation unit is disposed in a manner to align a longitudinal direction of the operation unit with a right-left direction and includes a grasping portion formed on an outer side in the right-left direction.

19. The grass cutter as claimed in claim 18, wherein:
the link mechanism turns the closing plate so as to open the conveyance path by the closing plate when the operation unit moves in a first direction for separating the grasping portion from the duct, and turns the closing plate so as to close the conveyance path by the closing plate when the operation unit moves in a second direction opposite to the first direction.

20. The grass cutter as claimed in claim 18, wherein:
the grasping portion extends in a direction orthogonal to a movement direction of the operation unit.

21. The grass cutter as claimed in claim 1, wherein:
an entirety of the turning shaft is positioned outside of the outer surface of the duct.

22. The grass cutter as claimed in claim 1, wherein:
the duct includes a flat side; and
the axis of the turning shaft is parallel to the flat side of the duct.

23. The grass cutter as claimed in claim 1, wherein:
the closing plate is fixed to the turning shaft for movement with the turning shaft between the open and closed positions.

24. A grass cutter comprising:
a duct extending in a conveyance direction of grass clippings and having a conveyance path for the grass clippings formed inside the duct;
a duct opening/closing lid comprising:
  a turning shaft extending outside of and along an outer surface of the duct;
  a closing plate disposed within the conveyance path inside the duct;
  the closing plate being turnable around an axis of the turning shaft to selectively move the closing plate between an open position and a closed position to open and close the conveyance path, respectively;
a side wall opening formed on a side wall of the duct;
the closing plate including a fixation portion that is fixed to the turning shaft, the fixation portion extending through the side wall opening from inside the duct to outside the duct.

25. The grass cutter as claimed in claim 24, wherein:
the side wall opening has a continuous periphery in the side wall of the duct.

26. The grass cutter as claimed in claim 24, wherein:
the fixation portion of the closing plate is affixed to the turning shaft outside the duct.

27. The grass cutter as claimed in claim 24, wherein:
the closing plate is fixed to the turning shaft for movement with the turning shaft between the open and closed positions.

28. The grass cutter as claimed in claim 24, wherein:
the side wall opening is an elongated opening through the side wall of the duct;
the fixation portion of the closing plate is a bent portion of the plate that is bent in relation to a remainder portion of the plate, the remainder portion of the plate being contained inside the duct; and
the fixation portion of the closing plate extends from the remainder portion of the plate and through the elongated opening through the side wall of the duct.

* * * * *